June 8, 1943.   M. LIWSCHITZ   2,321,302
ELECTRIC SHIP PROPULSION
Filed Aug. 22, 1941   2 Sheets-Sheet 1

WITNESSES:

INVENTOR
Michael Liwschitz.
BY
Paul E. Friedemann
ATTORNEY

June 8, 1943.  M. LIWSCHITZ  2,321,302

ELECTRIC SHIP PROPULSION

Filed Aug. 22, 1941  2 Sheets-Sheet 2

WITNESSES:
E.A. M'Closkey
Wm. L. Groome

INVENTOR
Michael Liwschitz.
BY
Paul E. Friedemann
ATTORNEY

Patented June 8, 1943

2,321,302

UNITED STATES PATENT OFFICE 2,321,302

ELECTRIC SHIP PROPULSION

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,941

4 Claims. (Cl. 172—8)

My invention relates to an electric propulsion system in which a synchronous motor is utilized to drive a load having inertia, and more particularly, to a ship propulsion system utilizing synchronous motors for driving ship propellers.

Synchronous motors are usually used for the electric propulsion of larger ships. As practiced by the prior art, the reversing and maneuvering are accomplished by means of the motor damper winding. While reversing the damper winding has to produce a high torque at high slip. High heat development in the damper winding is the result during each reversing process and it is well known that the damper winding is the weak point of the electric propulsion. Particularly difficult are the conditions for war ships, where the weight of the machines has to be held as low as possible, and there is thus no place in the propeller driving motors for heavy damper windings.

One object of my invention is to use dynamic braking in lieu of the braking with the damper winding.

Another object of my invention is the provision of utilizing, successively, dynamic braking, mechanical braking, asynchronous acceleration, and synchronous acceleration during a reversing process.

A broader object of my invention is the successive use of dynamic braking and mechanical braking to break the propeller from the water and to bring it to standstill.

Still other objects and advantages of the invention will become more apparent from a study of the following specification and the accompanying drawings, in which.

Figure 1:
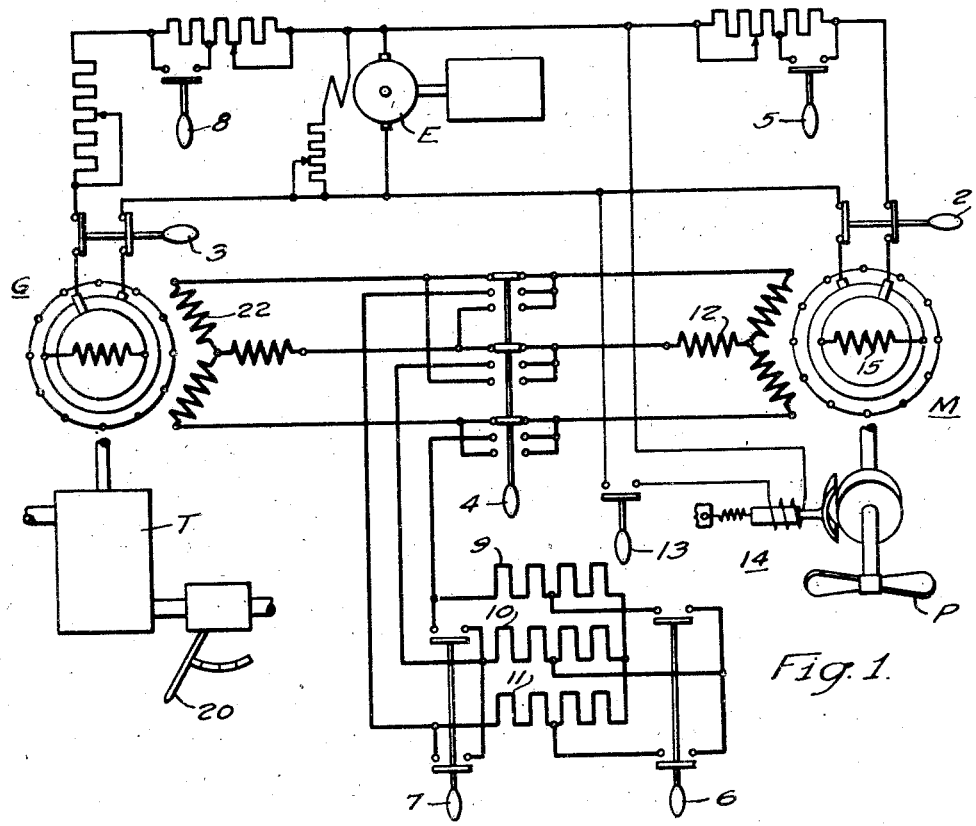
Figure 1 is a diagrammatic showing of my invention illustrating manual control only.
Figure 2:
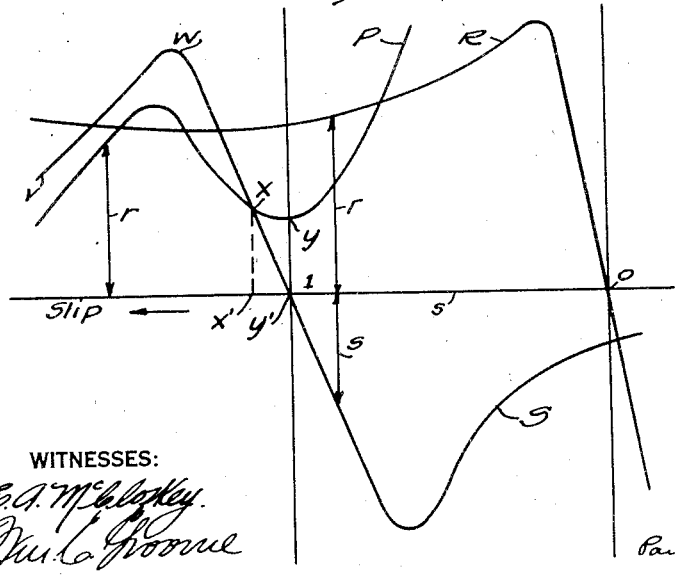
Fig. 2 shows some curves of value in disclosing the merits of my invention.

When a synchronous motor is running out of synchronism, it produces two torques, a rotor torque and a stator torque. The rotor torque, designated R in Fig. 2, is a result of the voltage impressed on the motor and disappears when the impressed voltage is zero, as will be the case when the generator field is not excited with direct current. The stator torque, designated S in Fig. 2, results from the direct-current excitation of the motor field, and this torque disappears when the motor field is not excited.

In Fig. 2, I show both these torques, R and S, in relation to slip $s$. When $s$ equals zero, it means the motor operates at synchronous speed, whereas when $s$ equals 1, it means the propeller is at standstill.

With my contribution to the art, I make it possible to entirely avoid the use of the damper windings between points $v$, $w$ and $x$. That is, for high slip, when the heat development in the damper winding would be high, I do not use it, but instead I use a resistor connected to the motor armature winding to brake the propeller from point $v$ to $x$.

By a suitable selection of the constants, for the dynamic braking resistors and by appropriately over-exciting the motor, the stator torque may be made to have the relation shown with reference to the propeller torque, namely, the curve $v$, $w$, $x$, will follow the contour of the propeller torque and at all points up to $x$ will be greater than the propeller torque.

At the speed corresponding to speed $x$, I use a mechanical brake 14 for braking the propeller shaft. This brake 14 almost immediately brings the propeller to standstill or to unity slip. A moment after the brake is applied the excitation is removed from the motor and a moment after removal of the excitation from the motor, the motor armature winding is connected to the generator for reverse operation. The generator is immediately over-excited so that the motor develops a heavy rotor torque, as the value of $r$ at unity slip. The instant the generator field has built up to its over-excited value, the brake is released, and the propeller is then accelerated by the motor, operating as an induction motor, to its full balancing induction motor speed.

At the balancing speed, the motor may be if desired temporarily over-excited to synchronize it. After synchronization, the speed of the generator is altered to the desired speed and both the generator and motor are normally excited. Since the mechanical brake is in use only a relatively short time during each reversing process, it can be designed for a low output only, that is, for a low heat development. The output need only correspond to the energy slightly less than represented by the area $x$, $y$, $y'$ and $x'$. Since the damper winding does not carry current during the dynamic braking, the heat development in the damper winding begins at or near point $y$, that is, at a relatively low slip, where the heat development is relatively low.

In my control, T represents the turbine, or Diesel engine, G the generator, M the propeller driving motor, E the exciter, and the necessary control switches are designated by reference characters to be referred to hereinafter.

A still better understanding of my invention may be had from a study of a typical reversing process. If the Diesel engine T is operating at full speed and the circuits are as indicated, let the assumption be that the motor M drives the propeller P at full speed for forward operation of the ship. If the command "full speed astern" is given, the attendant first cuts off the fuel and moves the speed lever 20 to a lower speed. This speed may be any lower speed, but preferably for a Diesel engine is about 30%, or 33%, of full speed, which is also a satisfactory synchronizing speed for the motor at some later stage of operation.

Second, switches 2 and 3 are opened and immediately thereafter, that is, as soon as the excitation has decreased on both the generator and motor, the switch 4 is moved to the intermediate position to disconnect alternator armature winding 22 from the motor armature winding 12 and to connect the resistors 9, 10 and 11 to the motor armature winding 12. Switches 2 and 5 are now closed to over-excite the motor M.

As the motor produces a heavy braking torque on the propeller, the propeller speed drops. The braking torque may be adjusted to follow curve $v, w, x$ and $y$. During this period of braking, switches 6 and 7, if such are used, are operated successively to alter the braking torque as desired.

When the speed has been decreased to point $x$, switch 13 is closed to apply the electro-mechanical brake 14, and substantially at the same time, but in the order given, switch 2 is opened, switch 4 is moved to reverse the connection of armature winding 12, and switches 3 and 8 are closed. Since the damper winding will develop an induction motor torque in the reverse direction, almost immediately the brake is released and switch 13 opened and the motor begins to accelerate the propeller P in the reverse direction.

At the balancing induction motor speed, switches 2 and 5 are closed to synchronize the motor with a high pulling torque. After synchronization, the speed lever 1 is moved to the desired speed and switches 5 and 8 are opened to provide normal excitation for the generator and the motor.

Figure 3:
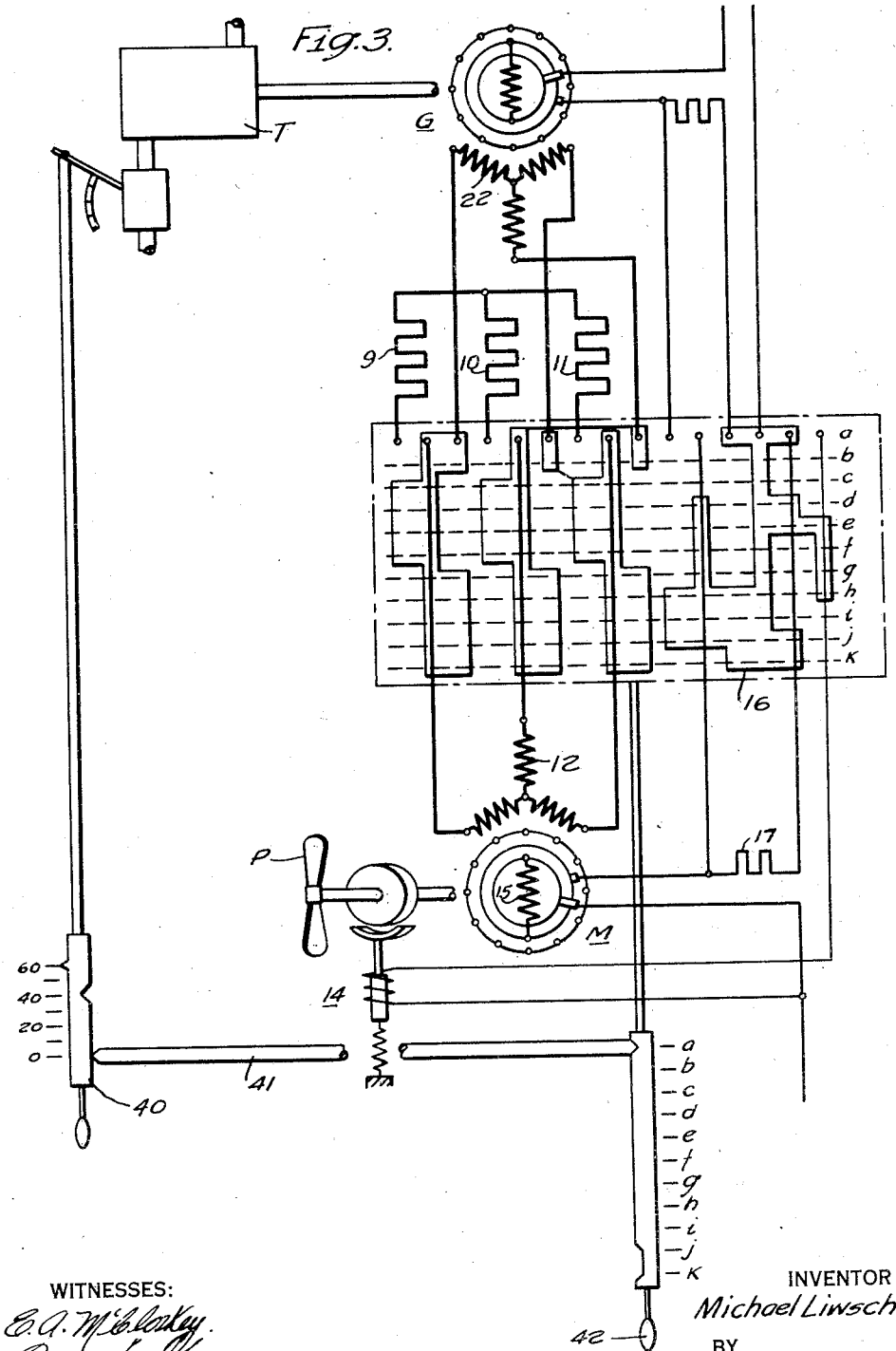
Fig. 3 is a diagrammatic showing of my invention illustrating a semi-automatic control.

In the showing of Fig. 3, the sequence of reversal is as follows: The speed lever 40 is first moved to a speed corresponding to twenty cycles per second, or some other low speed, for the alternator or generator G. The interlock 41 thus releases the reversing lever and this lever is then moved from position $a$ through positions $b, c,$ to position $d$.

In position $b$ the excitation is removed from both the alternator and the motor. In position $c$ the connection between the alternator armature winding 22 and the armature winding 12 of the motor M are interrupted, and the motor armature winding 12 is connected to resistors 9, 10 and 11, to effect dynamic braking of the motor. In position $d$ the motor field winding 15 is if necessary over-excited, since the segment 16 shunts resistor 17. This means a heavy dynamic braking is produced. This braking continues to point $x$ of curve $v, w, x, y$. When the propeller speed is decreased to point $x$, the lever 42 is moved to position $e$ whereupon the brake 14 is energized to stop the propeller P.

In a rather short time, the propeller is at stand-still and the lever 42 is moved to the succeeding positions. As a matter of fact lever 42 is moved from the $d$ position through positions $e, f, g, h,$ to the $i$ position as fast as is consistent with stopping the propeller and with the electrical changes that can be effected by such movement.

In position $e$, as already stated, the brake 14 is set. In position $f$ the excitation is removed from motor field 15. In position $g$ the resistors 9, 10 and 11 are disconnected from armature winding 12 and this armature winding is connected to the alternator armature winding 22 for reverse operation. In position $h$ the generator field is over-excited, and in the $i$ position, brake 14 is deenergized to release the propeller.

Since the preceding operations have in the meantime set up a strong rotor torque, the propeller, the instant it is released by the brake, starts rotating in the reverse direction.

When the propeller has been brought up to the balancing induction motor speed, the lever 42 is moved to the $j$ position. In this position, the motor field is again connected for excitation, or over-excitation if necessary, and thus synchronizes with a strong pull-in torque.

After synchronization, the lever 42 is moved to the $k$ position to thus remove the over-excitation from the generator and also from the motor if over-excitation was used so that these fields are excited normally. The speed lever 40 is now moved to any desired speed.

It is to be understood that my invention is not limited to the specific embodiments illustrated and described, but includes such modifications as are within the spirit of the invention and as fall within the scope of the claims hereto appended.

I claim as my invention:

1. In an electric ship-propulsion system in which a synchronous motor, designed to also operate as an induction motor, is used to operate the propeller, in combination, a synchronous motor having an armature winding, a damper winding, and a field winding, an alternator, a prime motor for driving the alternator, means for varying the speed of the prime mover, means, operable during a reversing process, to cause a dynamic braking of the motor, whereby the propeller speed is decreased to a predetermined speed less than standstill, means for mechanically braking the propeller to a standstill.

2. In an electric ship-propulsion system in which a synchronous motor, designed to also operate as an induction motor, is used to operate the propeller, in combination, a synchronous motor having an armature winding, a damper winding, and a field winding, an alternator, a prime mover for driving the alternator, means for varying the speed of the prime mover, means operable during a reversing process, to cause a dynamic braking of the motor, means for over-exciting the motor during the dynamic braking to increase the braking effect, whereby the propeller speed is decreased to a predetermined speed less than standstill, means for mechanically braking the propeller to standstill.

3. In an electric ship-propulsion system in which a synchronous motor, designed to also operate as an induction motor, is used to operate the propeller, in combination, a synchronous motor having an armature winding, a damper winding, and a field winding, an alternator, a prime mover for driving the alternator, means for varying the speed of the prime mover, means operable during a reversing process, to cause a dynamic braking of the motor, whereby the propeller speed is decreased to a predetermined speed less than standstill, means for mechanically braking the propeller to standstill, means for producing a rotor torque in the motor, said means for mechanically braking the propeller being made inactive as soon as the rotor torque is established, whereupon the propeller, being released by the mechanical braking means, is caused to operate in reverse direction.

4. In an electric ship-propulsion system in which a synchronous motor, designed to also operate as an induction motor, is used to operate the propeller, in combination, a synchronous motor having an armature winding, a damper winding, and a field winding, an alternator, a prime mover for driving the alternator, means for varying the speed of the prime mover, means operable during a reversing process, to cause a dynamic braking of the motor, means for over-exciting the motor during the dynamic braking to increase the braking effect, whereby the propeller speed is decreased to a predetermined speed less than standstill, means for mechanically braking the propeller to standstill, means for producing a rotor torque in the motor, means for over-exciting the alternator during the production of the motor torque, said means for mechanically braking the propeller being made inactive as soon as the rotor torque is established, whereupon the propeller, being released by the mechanical braking means, is caused to operate in reverse direction.

MICHAEL LIWSCHITZ.